United States Patent [19]
Louw

[11] 4,317,579
[45] Mar. 2, 1982

[54] VEHICLE TOWING TRAILER
[75] Inventor: Franklin S. Louw, Bedfordview, South Africa
[73] Assignee: Mobi-Jack (Proprietary) Limited, South Africa
[21] Appl. No.: 77,052
[22] Filed: Sep. 19, 1979
[51] Int. Cl.³ .............................................. B60P 3/06
[52] U.S. Cl. .................................. 280/402; 301/6 R
[58] Field of Search .................. 280/402; 188/112 R; 301/6 R, 6 S, 6 W, 6 CS; 362/61; 340/102, 84; 414/563

[56] References Cited
U.S. PATENT DOCUMENTS

| | | | |
|---|---|---|---|
| 1,993,430 | 3/1935 | Bell | 301/6 S |
| 2,138,267 | 11/1938 | Christenson | 180/112 R |
| 2,628,733 | 2/1953 | Hale | 280/402 X |
| 2,701,069 | 2/1955 | Hawkins | 280/402 X |
| 2,961,073 | 11/1960 | Legge et al. | 301/6 R |
| 2,975,401 | 3/1961 | Shupe | 340/102 |
| 3,035,728 | 5/1962 | Hecker | 280/402 X |
| 3,653,680 | 4/1972 | Denny | 280/402 |
| 3,885,146 | 5/1975 | Whitley | 362/61 |
| 4,118,047 | 10/1978 | Neasham | 280/402 |

FOREIGN PATENT DOCUMENTS

| | | |
|---|---|---|
| 558525 | 8/1932 | Fed. Rep. of Germany . |
| 1065735 | 3/1960 | Fed. Rep. of Germany . |
| 1232032 | 7/1967 | Fed. Rep. of Germany . |
| 284419 | 2/1928 | United Kingdom . |
| 895691 | 6/1959 | United Kingdom . |

OTHER PUBLICATIONS
Gm. 1,828,313, Schulte, Mar. 16, 1961.

Primary Examiner—John A. Pekar
Attorney, Agent, or Firm—Karl W. Flocks

[57] ABSTRACT

A carry towing trailer connectable to a towing vehicle and adapted to pass under the front or rear end of a vehicle to be towed. The trailer has small wheels and has means for elevating the load so that, in use, the trailer wheels run under the towed vehicle and between its wheels. The wheels have brake drums operable by slave cylinders fed with hydraulic fluid under pressure from a master cylinder whose plunger is connected to a coupler which is connectable to a draft vehicle.

3 Claims, 11 Drawing Figures

VEHICLE TOWING TRAILER

BACKGROUND OF THE INVENTION

This invention relates to a carry towing vehicle for carry towing vehicles.

By carry towing is meant, the towing of a vehicle whereby the front or rear end is raised or carried and is then towed by a towing vehicle. Towing vehicles known to the applicant for towing motor cars, are large and expensive vehicles. Such towing vehicles make use of a hoist or winch to suspend the front or rear end of a vehicle being carry-towed. This, more often than not, results in damage to the bumpers or fenders of the towed vehicle.

The applicant is also aware of smaller carry-towing trailers which, because of lack of adequate braking or other features, are not safe for use in the towing of vehicles of the size contemplated by the applicant.

A carry towing vehicle according to the invention is hereinafter referred to as a 'trailer'. Further, the 'towing' of the vehicle must be understood to include its 'carry towing'.

It is an object of this invention to provide a light towing trailer which can be coupled to a light towing vehicle and which nonetheless has brakes of sufficient capacity to permit the towing of even large passenger cars or light trucks with safety.

SUMMARY OF THE INVENTION

Accordingly, the invention provides a carry towing trailer which includes:

a chassis having support means for supporting a vehicle to be carry towed;

a coupler at a leading end of the chassis for coupling to a towing vehicle for towing in a longitudinal direction;

a pair of trailer wheels rotatably mounted about a transverse axis and supporting the chassis, the trailer wheels being of such a size and so positioned that, in use, they can run within the track width of and under a vehicle to be carry towed; and an automatic override brake connected to the coupler and operable on the trailer wheels.

Under 'track width of a vehicle' must be understood the spacing between a pair of wheels of the vehicle; the said pair of wheels being mounted in their normal positions on the vehicle.

Each of the trailer wheels may have a wheel rim and a brake drum and a mounting ring, and securing means for securing the wheel rim via the mounting ring to the brake drum. The wheel rim may be detachable from the mounting ring. A wheel rim may be in two co-operating rim parts mating along a plane at right angles to the rotational axis of the wheel. If desired, the diameter of a brake drum may be the same as the diameter of the tire inside the opening within the beading. The brake drum may have a spigot formation fitting snugly into a socket defined by the cylindrical inner surface of the wheel rim.

The support means may be disposed ahead of the rotational axis of the trailer wheels.

The pair of wheels may have axles on a pair of arms pivotally mounted on the chassis about a transverse axis.

The invention may further include displacement means operable to displace the arms with the trailer wheels about their pivotal axis relative to the chassis, so as to permit raising and lowering of the chassis relative to a surface supporting the wheels. The displacement means may include a hydraulic ram operatively connected between the chassis and the arms. The displacement means may further include a hydraulic pump operable to supply hydraulic fluid under pressure for operating the hydraulic ram.

The support means may include a pair of transversely spaced cradles adapted to receive a pair of wheels of a vehicle to be carry towed. The support means may further include clamping means for clampingly engaging a vehicle to be carry towed and the said clamping means may include a pair of transversely spaced clamps for clamping an axle or part of a vehicle to be carry towed.

The support means may be mounted on a telescopic member forming part of the chassis and which is telescopically extendable and retractable such that during loading such mounting of the support means is behind the rotational axis of the trailer wheels, and such that during towing, the mounting means is ahead of such axis.

The support means may include a support beam which may be pivotally mounted on the telescopic member, about an upwardly directed axis, the beam being disposable longitudinally when the trailer is unloaded and transversely when loaded.

A trailer according to the invention may further include retracting means for retracting the telescopic member from an extended position into a retracted position. The retracting means may include a winch, and a winch rope with a hook engageable with the telescopic member.

By way of development, the invention may include a further pair of wheels having axles on a second pair of arms pivotally mounted on the chassis about a transverse axis disposed forwardly of the pivotal axis of the arms of the first pair of wheels; and connecting means interconnecting the arms of the two pairs of wheels to ensure that they can move in unison.

The override brake may include a hydraulic plunger and cylinder assembly operatively connected via a hydraulic line on the chassis and thence via flexible conduits to hydraulic brake cylinders provided on the trailer wheels, the cylinder being mounted on the chassis, and the coupler being connected to the plunger, lost motion being provided between the coupler and the chassis during towing. The override brake may also include a displaceable stop positionable to prevent operation of the brakes of the trailer by taking up the lost motion between the coupler and the chassis and thereby preventing displacement of the plunger relative to the cylinder during towing.

Embodiments of carry towing trailers in accordance with the invention are now described by way of example with reference to the accompanying drawings.

DESCRIPTION OF THE PREFERRED EMBODIMENTS

Figure 1:
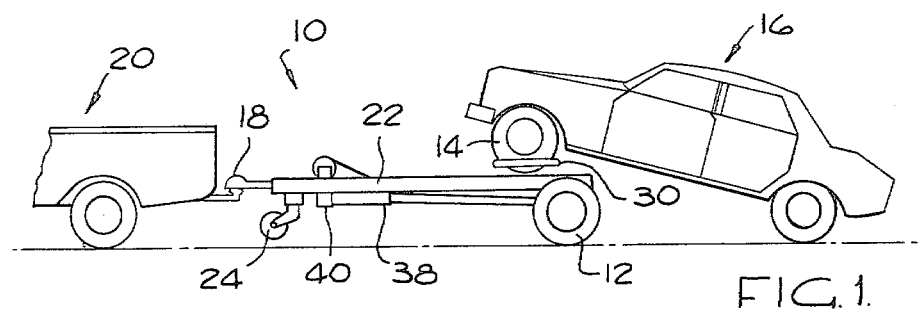
FIG. 1 shows diagrammatically in side elevation a carry towing trailer according to the invention, in use.

Referring to the drawings, reference numeral 10 refers generally to one embodiment of a carry towing trailer according to the invention, having a pair of closely spaced wheels 12 adapted to run within the track width of a vehicle 16 being carry towed by the trailer. The track width of the vehicle 16 is the spacing between the wheels 14. The trailer also has a coupler 18 for coupling to a towing vehicle 20. The coupler 18 has an automatic override brake (described more fully hereafter) operable on the wheels of the trailer 10.

The trailer has a chassis in the form of a beam 22 extending longitudinally and having a jockey wheel 24 at its leading end, the wheels 12 being provided at its trailing end.

The trailer 10 is provided with vehicle support means generally indicated by reference numeral 26, including a support beam 28 having a pair of transversely spaced wheel cradles 30. The support beam is pivotally supported on the chassis about the upwardly directed axis of a pin 32. The support beam 28 is also pivotally mounted about a longitudinal axis intersecting the axis of pin 32, and providing limited pivotal movement on either side of the pin 32. The cradles 30 are provided with flanges 30.1 to support them evenly on the ground.

The wheels 12 are shown to be connected to the chassis 22 via arms 34 having stub axles 36 rotatably supporting the wheels of the trailer. The arms 34 are pivotally mounted on the chassis 22 about a transverse axis.

The trailer further includes displacement means including a hydraulic ram 38 having an anchor point 40 on the chassis, and pivotally connected to the arms 34 at 42 whereby the chassis 22 may be raised and lowered relative to the wheels and their supporting surface by displacing the arms 34 with the trailer wheels, about their pivotal axis relative to the chassis 22. The hydraulic ram 38 is operable by a hydraulic pump 43 having a handle 43.1.

A telescopic member 22.1 forms part of the chassis 22, and is telescopically extendable and retractable. The telescopic member 22.1 pivotally supports the support beam 28 about the axis of pin 32. The telescopic member 22.1 can be drawn into the chassis 22 by means of retracting means comprising a winch 44 and a winch rope 44.1 having a hook 46. The winch is operable by means of a handle and ratchet combination 48 and 50.

The coupler 18 embodies an automatic override brake system 60. A removable stop 62 is provided to render the automatic operation of the brake inoperative, when desired. The system comprises a shank 61 connected to a piston inside a master cylinder 64 having a reservoir 66, and comprises a hydraulic line 68 and flexible conduits 68.1 connected to brake cylinders 70 of the wheels 12.

Figure 2:
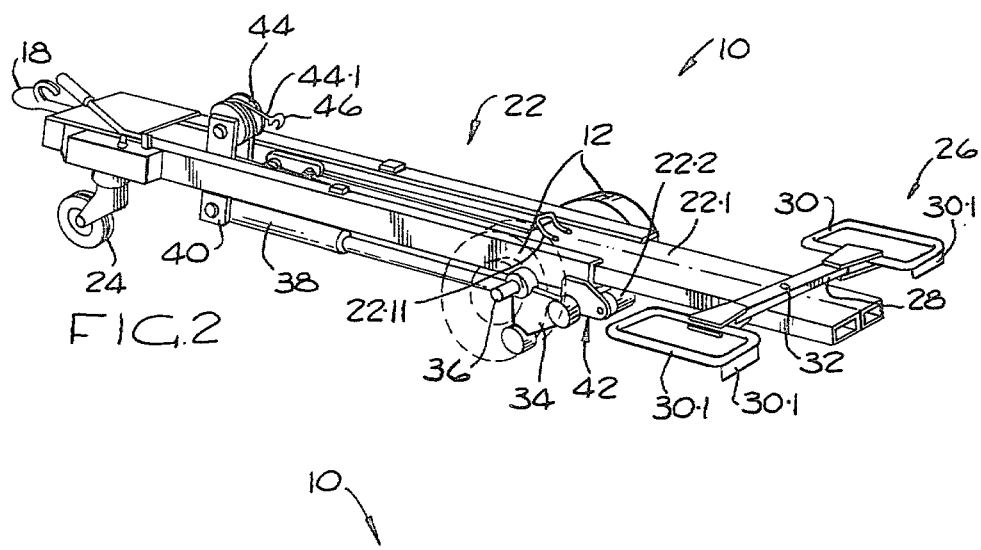
FIG. 2 shows an oblique rear view of the carry towing trailer, with the chassis in the partially lowered extended position.
Figure 3:
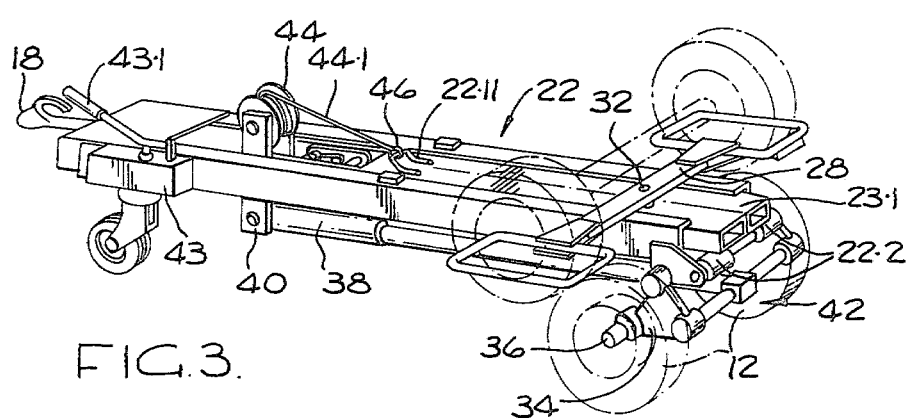
FIG. 3 shows an oblique rear view of the trailer in the raised position showing in dotted the wheels of a vehicle being towed located in the towing position.

In use, the carry towing trailer 10 is backed up to the front or rear of a vehicle 16 which is to be towed. Thereupon the telescopic member 22.1 is extended, as shown in FIG. 2 of the drawings. The chassis 22 is then lowered fully, i.e., beyond the position shown in FIG. 2 of the drawings. The vehicle support beam 28 is then pivotally swung about the axis of pin 32 until the wheel cradles 30 are in alignment with the wheels of the vehicle 16 to be towed. Thereupon, the winch hook 46 is hooked onto the vehicle which is to be towed, and the winch rope 44.1 is hauled in by the operation of the winch 44 by means of the handle and ratchet mechanism 48 and 50, until the wheels 14 seat in the wheel cradles 30. Thereupon, the hook 46 is detached, and it is hooked onto the handle 22.11. The hydraulic ram is then pumped up, thereby causing the arms 34 to pivot about their pivotal axis thereby raising the chassis 22. Once the chassis has been raised, the winch is operated and the telescopic member 22.1, with the wheels of the vehicle to be towed, nesting in the cradles 30, is hauled in by operating the winch 44. The telescopic member 22.1 rolls on the chassis rollers 22.2. The extent to which the telescopic member 22.1 is hauled in, is such that the pivotal axis of the pin 32 lies ahead of the rotational axis of the wheels 12 as shown in FIG. 1 of the drawings.

The telescopic member 22.1 is provided with catches for retaining it in its retracted position. These catches are not shown but are in the form of gravity or spring-biassed catches, co-operating with mating formations in the chassis 22.

Figure 4:
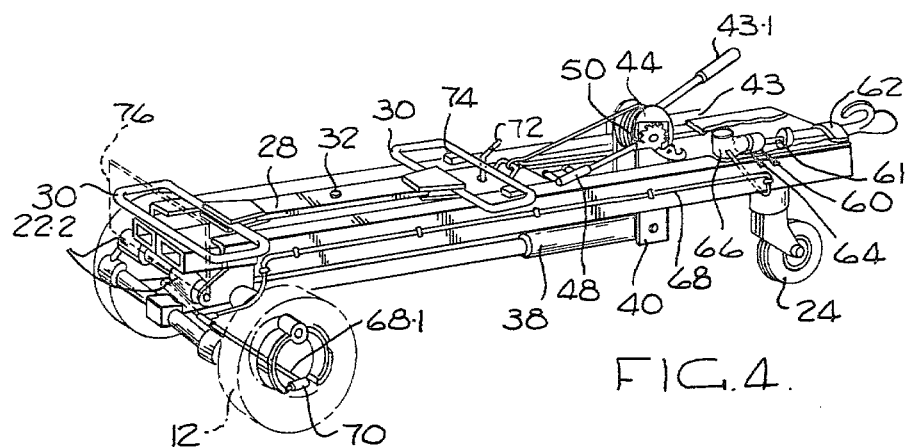
FIG. 4 shows an oblique rear view of the trailer in the retracted unloaded towing condition.

When the carry towing trailer is not being used for carry towing vehicles, then the support beam 28 will be swung about the axis of pin 32 so that it lies in a longitudinal direction, as shown in FIG. 4 of the drawings. The wheel support means will be locked in position by a screw-type locking handle 72, screwing the wheel support 30 against pads 74 on the chassis 22.

Figure 9:
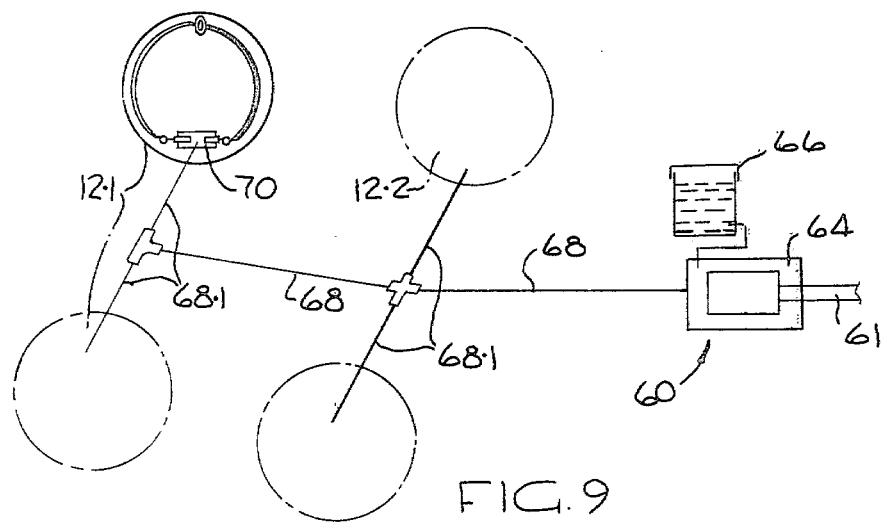
FIG. 9 shows an hydraulic diagram of the override brake of the trailer of FIG. 5.

Referring to FIGS. 4 and 9, when the towing vehicle 20, in operation, slows down or brakes, the trailer 10 will override the vehicle 20. The shank 61 will move inwards thereby taking up lost motion and exerting pressure in the master cylinder 64 and causing the brakes 70 to be applied. When the vehicle 20 pulls the shank 61, the pressure is reduced and the brakes are released.

When the towed vehicle is to be lowered, the ram is retracted thereby causing the arms 34 to pivot. The chassis is thereby lowered and the towed vehicle can be removed.

A feature of this invention is that the hydraulic ram is provided with a valve to retain the ram in the chassis in the raised position. Failure of hydraulic pressure in the ram during towing will result in slight lowering of the chassis until the support beam 28 or cradles 30 engage the wheels 12 thereby exerting a braking force on the wheels 12. The driver of the towing vehicle will then immediately become aware of some fault in the trailer.

Figure 10:
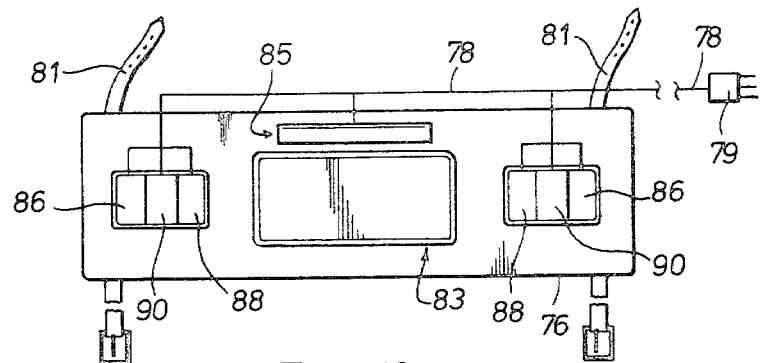
FIG. 10 shows a schematic diagram of a frame having signalling lights.

The trailer 10 has a detachable frame 76 (see FIGS. 4, 6 and 10) comprising a number plate and signalling light arrangement operable via a seven core cable 78 and plug 79 from a towing vehicle. This arrangement is used when the trailer is being taken unloaded from one place to another with the support beam 28 in its longitudinal position. The arrangement is detachably mounted on one wheel cradle 30. When the trailer is to be loaded then the frame 76 is removed and is temporarily secured by tie-on straps 81 to the rear of the towed vehicle. The cord has sufficient length to permit this to be done. The frame 76 has room for a number plate 83, number plate light 85, and rear lights 86, stop lights 88, and indicator lights 90.

Figure 8:
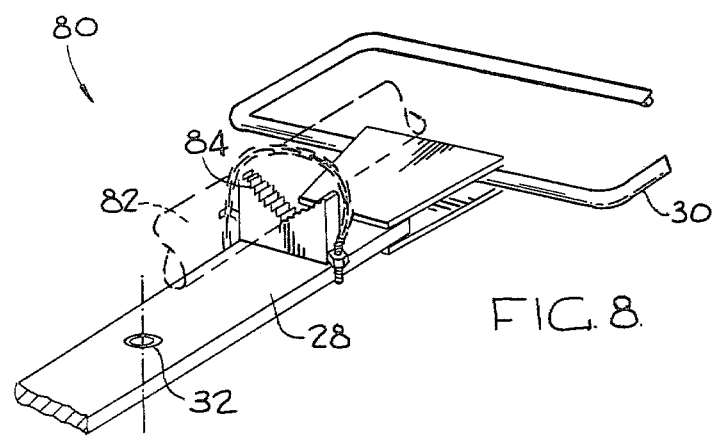
FIG. 8 shows a three-dimensional view of a clamp for clamping a vehicle to a trailer according to the invention.

Instead of or in addition to wheel cradles 30, the telescopic member 22.1 may be provided with a clamp 80 as shown in FIG. 8, at its end remote from the winch 44. If desired, a pair of such clamps may be provided, spaced transversely. Such clamps can be in the form of pipe vices, as shown in FIG. 8, adapted to receive an axle 82 of a vehicle to be towed. Instead of the axle 82, some other part of the chassis of the vehicle to be towed may be received into the jaw 84 of the clamp. When two such clamps are provided at a transverse spacing then lateral stability will be provided during towing.

The clamps 80 may be mounted to be transversely adjustable in position on the support beam 28 to provide adjustability in their transverse spacing. This is to accommodate vehicles having different types of construction for their suspensions.

On the other hand for some applications, the transverse spacing between the clamps 80 need not be very great and may still lie within the space between the wheels 12. Accordingly, with such a construction it is not necessary to have the support beam pivotally mounted on the telescopic member 22.1. The support beam 28 with clamps 80 can then be fast with the telescopic member 22.1.

Figure 5:
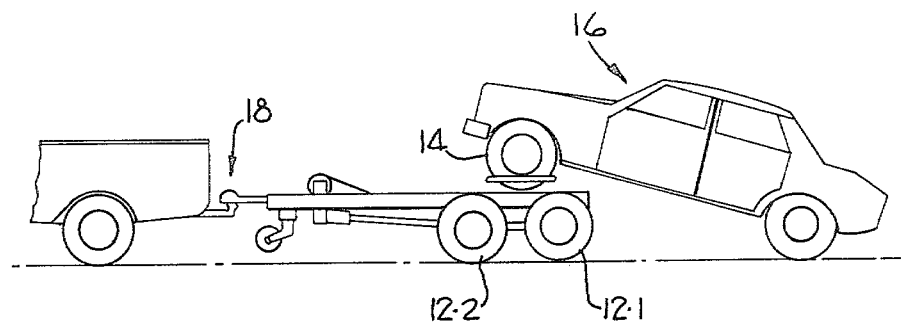
FIG. 5 shows diagrammatically in side elevation another embodiment of a carry towing trailer according to the invention, in use.
Figure 6:
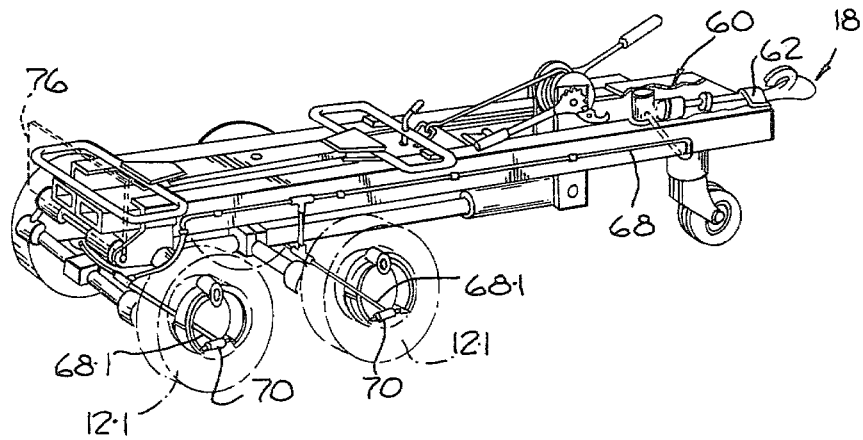
FIG. 6 shows an oblique rear view of the trailer of FIG. 5 in the retracted unloaded towing condition.
Figure 7:
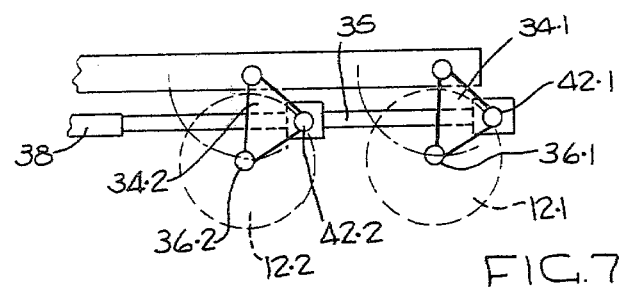
FIG. 7 shows diagrammatically a side view of the wheel arrangement of the trailer of FIGS. 5 and 6.

Referring to FIGS. 5, 6 and 7 of the drawings, another embodiment of a carry towing trailer in accordance with the invention is shown. Parts of this embodiment corresponding to parts of the first embodiment hereinbefore described, are indicated by corresponding numerals. The description relating to the first embodiment as illustrated in FIGS. 1 to 4 is in principle also applicable to the second embodiment as illustrated in FIGS. 5, 6 and 7.

The embodiment of the trailer in accordance to the invention as described in FIGS. 5, 6, and 7, has two pairs of wheels 12.1 and 12.2. The two pairs of wheels are provided at the trailing end of the trailer adapted to run within the track width of a vehicle 16 being carry towed.

In use, when the vehicle 16 is being carry towed, the front wheels 14 of the vehicle are supported on support means which is positioned between the axes of the pairs of wheels 12.1 and 12.2 of the trailer as is shown in FIG. 5.

Referring to FIG. 7 of the drawings, the pairs of wheels 12.1 and 12.2 are shown to be connected to the chassis 22 via arms 34.1 and 34.2 having stub axles 36.1 and 36.2 rotatably supporting the wheels of the trailer.

This embodiment also has retracting means including a hydraulic ram 38, having an anchor point 40 on the chassis, and pivotally connected to the arms 34.1 at 42.1, and to the arms 34.2 at 42.2. The arms 34.1 and 34.2 are interconnected by connecting means 35 to ensure that the arms move in unison. The chassis 22 may be raised and lowered relative to the wheels and their supporting surface by displacing the arms 34.1 and 34.2 in unison with their pairs of wheels about their pivotal axes relative to the chassis 22, by means of the ram 38.

Figure 11:
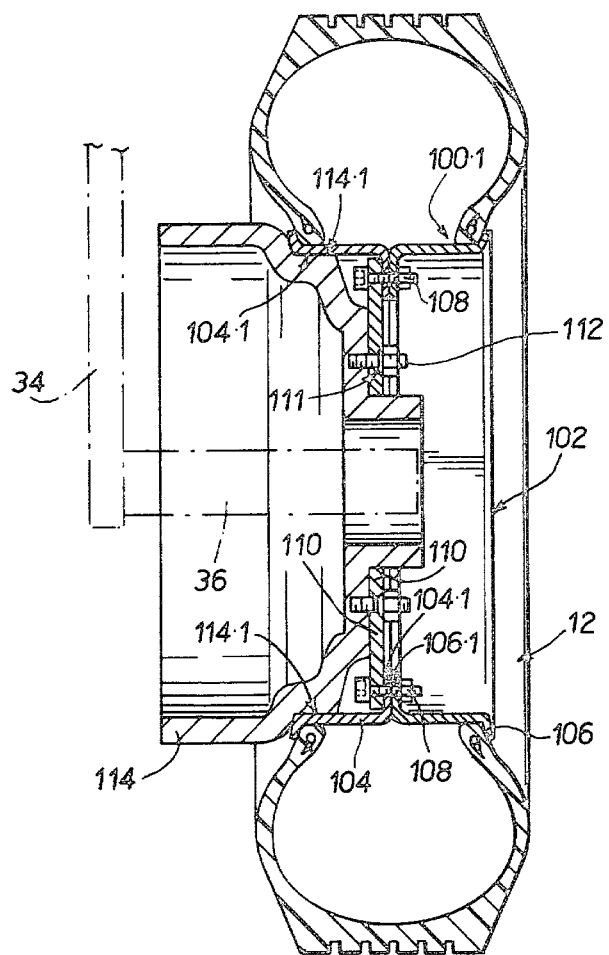
FIG. 11 shows an axial section through a wheel and brake drum assembly.

Referring now to FIG. 11 of the drawings, there is shown an axial section through a trailer wheel 12. The wheel 12 comprises a pneumatic tire 100, a wheel rim 102 in the form of two co-operating rim parts 104 and 106 mating along a plane between the abutting flanges 104.1 and 106.1. The wheel rim 102 is secured by means of screws 108 to a mounting ring 110. The ring 110 has openings 111 to receive the studs 112 for securing the wheel to a brake drum 114.

The construction shown in the drawing was adopted so as to be able to fit heavy duty brake drums to the small wheels needed to run under a towed vehicle. It will be noted that the diameter of the brake drum is substantially the same as that of the tire 100 inside the opening within the beading 100.1.

The brake drum 114 has a spigot formation 114.1 fitting snugly into the cylindrical recess defined by the inner surface 104.1 of the rim part 104.

It is an advantage of this invention that a breakdown trailer is provided whereby even a heavy vehicle which has broken down away from a garage, can be towed in with safety by any towing vehicle having a coupler matching the coupler 18 of the invention.

The embodiments of a carry towing trailer as illustrated in the drawings, are less expensive, safer to use and easier to operate than other towing vehicles known to the applicant.

I claim:

1. A carry towing trailer which includes:
   a chassis having support means for supporting a vehicle to be carry towed;
   a coupler at a leading end of the chassis for coupling to a towing vehicle for towing in a longitudinal direction;
   a pair of trailer wheels rotatably mounted about a first transverse axis and supporting the chassis;
   an automatic override brake connected to the coupler and operable on the trailer wheels;
   said pair of trailer wheels having their axes mounted on a pair of arms pivotally mounted on the chassis about a second transverse axis parallel to the first transverse axis; and
   hydraulic displacement means operable to displace said arms about said second transverse axis to cause raising and lowering of the chassis relative to said trailer wheels;
   said trailer wheels being located beneath said support means for supporting the vehicle being carry towed whereby loss of hydraulic pressure in said displacement means during a towing operation allows said chassis to fall relative to the trailer wheels causing engagement of said support means with said trailer wheels and consequent application of a braking affect on said wheels.

2. A trailer according to claim 1 wherein said support means is disposed slightly ahead of said trailer wheels when said chassis is in raised position relative to the wheels, said support means lying substantially on the arc of upward rotation of the first transverse axis about said second transverse axis when said chassis moves towards its lowered position.

3. A carry towing trailer which includes:
   a chassis having support means for supporting a vehicle to be carry towed;

a coupler at a leading end of the chassis for coupling to a towing vehicle for towing in a longitudinal direction;

a pair of trailer wheels rotatably mounted about a transverse axis and supporting the chassis, an automatic override brake connected to the coupler and operable on the trailer wheels;

said pair of trailer wheels having their axes mounted on a pair of arms pivotally mounted on the chassis about a second transverse axis parallel to the first transverse axis;

a further pair of trailer wheels having their axes mounted on a second pair of arms pivotally mounted on the chassis about a third transverse axis parallel to and disposed forwardly of said second transverse axis;

connecting means interconnecting the first and second pairs of arms to ensure that they move in unison; and means operable to rotate said arms to cause raising and lowering of the chassis relative to all the trailer wheels;

said support means being located between said first and second pair of trailer wheels whereby to distribute the weight of the vehicle being carry towed substantially uniformly on the four trailer wheels.

* * * * *